USO10101451B2

(12) United States Patent
Liu et al.

(10) Patent No.: US 10,101,451 B2
(45) Date of Patent: Oct. 16, 2018

(54) DISTANCE MEASURING DEVICE AND DISTANCE MEASURING METHOD THEREOF

(71) Applicant: INDUSTRIAL TECHNOLOGY RESEARCH INSTITUTE, Hsinchu (TW)

(72) Inventors: Tze-An Liu, Hsinchu (TW); Hau-Wei Lee, Changhua County (TW); Huay-Chung Liou, Hsinchu County (TW); Shan-Peng Pan, Hsinchu (TW); Po-Er Hsu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 15 days.

(21) Appl. No.: 15/360,423

(22) Filed: Nov. 23, 2016

(65) Prior Publication Data

US 2017/0329009 A1 Nov. 16, 2017

(30) Foreign Application Priority Data

May 10, 2016 (TW) .............................. 105114460 A

(51) Int. Cl.
*G01B 9/02* (2006.01)
*G01S 17/08* (2006.01)
(Continued)

(52) U.S. Cl.
CPC .............. *G01S 17/08* (2013.01); *G01B 11/14* (2013.01); *G01S 3/786* (2013.01); *G01S 7/4811* (2013.01);
(Continued)

(58) Field of Classification Search
CPC ............ G01B 9/02029; G01B 9/02071; G01B 2290/70; G01B 11/14; G01S 3/786; G01S 7/4811; G01S 7/4913; G01S 17/08
See application file for complete search history.

(56) References Cited

U.S. PATENT DOCUMENTS 4,714,339 A 12/1987 Lau et al.
6,147,748 A 11/2000 Hughes
(Continued)

FOREIGN PATENT DOCUMENTS

CN 1060268 C 1/2001
CN 101076743 A 11/2007
(Continued)

OTHER PUBLICATIONS

Hau-Wei Lee et al; "Development of a steel ball center alignment device based on Michelson interference concept"; Review of Scientific Instruments 85, 2014; pp. 095115-1 to 095115-6.
(Continued)

*Primary Examiner* — Michael A Lyons
(74) *Attorney, Agent, or Firm* — Muncy, Geissler, Olds & Lowe, P.C.

(57) ABSTRACT

In an embodiment, a distance measuring device comprises an absolute distance measuring module, a tracking module, a two-axis rotating mechanism and a signal controlling and processing module to track an object and measure a distance between the distance measuring device and the object. The absolute distance measuring module measures an absolute distance between the distance measuring device and the object. The absolute distance measuring module and the tracking module are combined by using a dichroic beam splitter, and then all of them are further disposed in the two-axis rotating mechanism. When the object moves, a tracking optical path changes accordingly. A quadrant photodetector of the absolute distance measuring module detects (Continued)

the changes to avoid the distance measuring optical path being interrupted, and generates and transmits the signal to the signal controlling and processing module for controlling the two-axis rotating mechanism to rotate, thereby tracking the object.

24 Claims, 4 Drawing Sheets

(51) Int. Cl.
G01S 3/786 (2006.01)
G01S 7/491 (2006.01)
G01S 7/481 (2006.01)
G01B 11/14 (2006.01)
G01S 17/66 (2006.01)
G01S 7/499 (2006.01)

(52) U.S. Cl.
CPC ............ *G01S 7/4818* (2013.01); *G01S 7/499* (2013.01); *G01S 7/4913* (2013.01); *G01S 17/66* (2013.01)

(56) References Cited

U.S. PATENT DOCUMENTS

| | | | |
|---|---|---|---|
| 6,667,798 | B1 | 12/2003 | Markendorf et al. |
| 7,174,652 | B2 | 2/2007 | McMurtry |
| 7,388,674 | B2 | 6/2008 | Yanaka et al. |
| 7,538,888 | B2 | 5/2009 | Hara et al. |
| 7,599,070 | B2 | 10/2009 | Taketomi et al. |
| 7,636,170 | B1 | 12/2009 | Jywe et al. |
| 8,199,330 | B2 | 6/2012 | Hara |
| 2003/0020895 | A1* | 1/2003 | Bridges ................. G01S 7/4811 356/4.01 |
| 2007/0024861 | A1* | 2/2007 | Yanaka ................. G01B 11/03 356/498 |
| 2009/0033945 | A1* | 2/2009 | Meier ................. G01S 7/481 356/498 |
| 2011/0032509 | A1* | 2/2011 | Bridges ................. G01S 7/4818 356/5.13 |
| 2011/0069319 | A1* | 3/2011 | Nara ................. G01S 7/4811 356/500 |
| 2012/0262550 | A1* | 10/2012 | Bridges ................. G01C 15/002 348/46 |
| 2015/0309175 | A1 | 10/2015 | Hinderling et al. |
| 2016/0252619 | A1* | 9/2016 | Markendorf ......... G01S 17/023 356/3.01 |
| 2017/0003372 | A1* | 1/2017 | Antoina ................. G01S 17/66 |

FOREIGN PATENT DOCUMENTS

| | | |
|---|---|---|
| CN | 100403090 C | 7/2008 |
| CN | 101995577 A | 3/2011 |
| TW | 315407 B | 9/1997 |
| TW | 200513632 | 4/2005 |
| TW | M378379 U | 4/2010 |
| TW | I394376 B | 4/2013 |
| TW | M451527 U1 | 4/2013 |
| TW | I437208 B | 5/2014 |

OTHER PUBLICATIONS

Hau-Wei Lee et al; "Relationship between ISO 230-2/-6 Test Results and Positioning Accuracy of Machine Tools Using LaserTRACER"; Appl. Sci. 2016, 6; 105; pp. 1-15.

Hau-Wei Lee et al; "Evaluating Position Accuracy of Machine Tools Using a Laser Interferometer"; The Journal of the CMSC/Spring 2016; pp. 26-29.

I. Coddington et al; "Rapid and precise absolute distance measurements at long range"; Nature Photonics | vol. 3; Jun. 2009; pp. 351-356.

Tze-An Liu et al,"Sub-micron absolute distance measurements in sub-millisecond times with dual free-running femtosecond Er fiber-lasers"; Optics Express; vol. 19, No. 19; Sep. 12, 2011; pp. 1-9.

Hongyuan Zhang et al; "Absolute distance measurement by dual-comb nonlinear asynchronous optical sampling"; Optics Express; vol. 22, No. 6; Mar. 24, 2014; pp. 1-8.

I. Coddington et al; "Coherent linear optical sampling at 15 bits of resolution"; Optics Letters;vol. 34, No. 14; Jul. 15, 2009; pp. 2153-2155.

Klaus Wendt et al; "Measuring large 3D structures using four portable tracking laser interferometers"; Measurement 45; 2012; pp. 2339-2345.

Pek Loo Teoh et al; "The measurement uncertainties in the laser interferometry-based sensing and tracking technique" Measurement 32; 2002; pp. 135-150.

Jean-Marc Linareset al "Impact of measurement procedure when error mapping andcompensating a small CNC machine using a multilaterationlaser interferometer" Precision Engineering 38; 2014; pp. 578-588.

\* cited by examiner

DISTANCE MEASURING DEVICE AND DISTANCE MEASURING METHOD THEREOF

CROSS REFERENCE TO RELATED APPLICATION

This application claims the priority benefit of Taiwan application serial no. 105114460, filed on May 10, 2016. The entirety of the above-mentioned patent application is hereby incorporated by reference herein.

TECHNICAL FIELD

The technical field relates to a distance measuring device and a distance measuring method thereof.

BACKGROUND

General non-contact optical distance measuring devices have their limitations. Some of the distance measuring devices can only measure related distances of moving objects. Although, those distance measuring devices can measure an absolute distance between an object and a distance measuring device, the accuracy of the measuring is not high. Therefore, how to accurately measure the absolute distance between an object and a distance measuring device is one of goals to achieve in this industrial technology field.

SUMMARY OF THE DISCLOSURE

This disclosure provides a distance measuring device and the distance measuring method thereof, which may accurately measure a distance between the distance measuring device and an object.

According to an embodiment of the disclosure, a distance measuring device is provided. The distance measuring device is used for tracking an object and measuring a distance between the distance measuring device and the object. The distance measuring device comprises an absolute distance measuring module, a tracking module, a dichroic beam splitter, a signal controlling and processing module and a two-axis rotating mechanism. The absolute distance measuring module is used to emit a measurement light for measuring an absolute distance between the distance measurement device and the object. The tracking module is used to emit a tracking light to track the absolute distance between the distance measuring device and the object. The measurement light and the tracking light are incident to the object via the dichroic beam splitter. The two-axis rotating mechanism controlled by the signal controlling and processing module is used to track the object by driving the absolute distance measuring module, the tracking module and the dichroic beam splitter.

According to another embodiment of the disclosure, a measuring device is provided. The distance measuring device is used for measuring a distance between the distance measuring device and an object. The distance measuring device includes a first light emitter, a reference point, a dichroic beam splitter, a polarized beam splitter and a signal controlling and processing module. The first light emitter is used to emit a first distance measurement light and a sampling light. The polarized beam splitter is used to split the first distance measurement light into a first splitting light and a second splitting light. The first splitting light is coupled with the second splitting light through a first optical path to form a second distance measurement light. The first optical path passes through, in order, the dichroic beam splitter, the object, the dichroic beam splitter, the polarized beam splitter, the reference point, and the polarized beam splitter. The signal controlling and processing module calculates the distance according to the second distance measurement light and the sampling light.

According to another embodiment of the disclosure, a distance measuring method is proposed. The distance measuring method includes: providing a distance measuring device having a first light emitter, a reference point, a dichroic beam splitter, a polarized beam splitter and a signal controlling and processing module; emitting a first distance measurement light and a sampling light by the first light emitter, wherein the first distance measurement light is split into a first splitting light and a second splitting light by the polarized beam splitter; coupling the first splitting light with the second splitting light through a first optical path to form a second distance measurement light; the first optical path passing through, in order, the dichroic beam splitter, the object, the dichroic beam splitter, the polarized beam splitter, the reference point and the polarized beam splitter; and calculating, by the signal controlling and processing module, the distance according to the second distance measurement light and the sampling light.

The foregoing will become better understood from a careful reading of a detailed description provided herein below with appropriate reference to the accompanying drawings.

DETAILED DESCRIPTION OF DISCLOSED EMBODIMENTS

Figure 1:
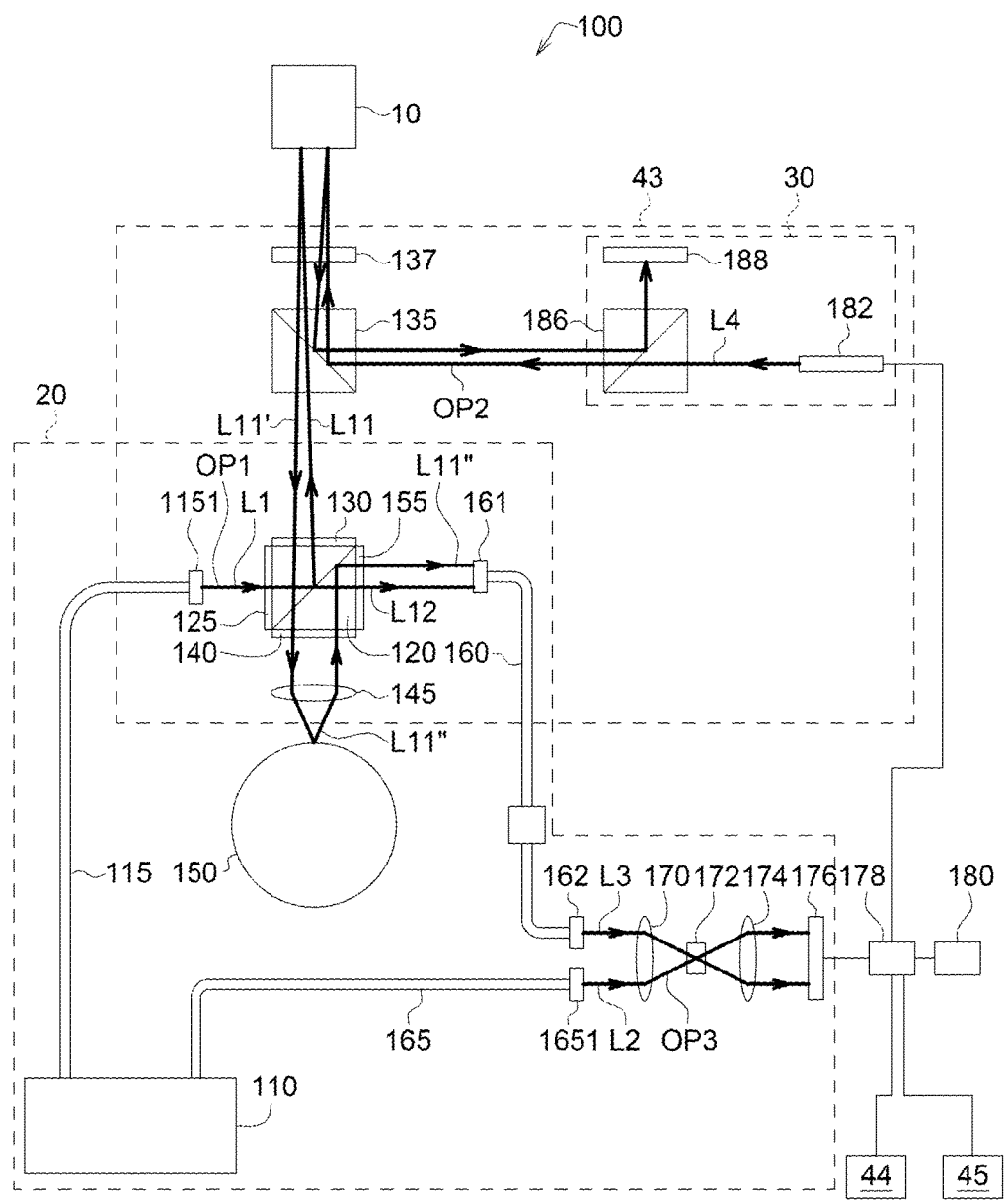
FIG. 1 illustrates a distance measuring device in accordance with an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a distance measuring device 100 according to an embodiment of this disclosure. The distance measuring device 100 is used to measure a distance between an object 10 and the distance measuring device 100. The object 10 is not limited to a stationary object. Even if the object 10 moves, the distance measuring device 100 can still track the object 10 and measure an absolute distance between the object 10 and the distance measuring device 100. According to an embodiment, a reflective mirror can be disposed on the surface of the object 10 or the object 10 itself has a reflective surface capable of reflecting light.

The distance measuring device 100 includes a light emitter 110, a first fiber 115, a polarized beam splitter 120, a first polarizer 125, a first wave plate 130, a dichroic beam splitter 135, a beam expander 137, a second wave plate 140, a first convex lens 145, a reference point 150, a second polarizer 155, a second fiber 160, a third fiber 165, a second convex lens 170, a crystal frequency multiplier 172, a third convex lens 174, a photodetector 176, a signal controlling and processing module 178, a display 180, a second light emitter 182, a light tracking splitter 186 and a quadrant photodetector 188.

In addition, in the embodiment, the light emitter 110, the first fiber 115, the polarized beam splitter 120, the first polarizer 125, the first wave plate 130, the second wave plate 140, the first convex lens 145, the reference point 150, the second polarizer 155, the second fiber 160, the third fiber 165, the second convex lens 170, the crystal frequency multiplier 172, the third convex lens 174, and the photodetector 176 may be assembled as an absolute distance measuring module 20. According to another embodiment, the absolute distance measuring module 20 further comprises another part other than the aforementioned parts, or omits one or some of the aforementioned parts.

Furthermore, the second light emitter 182, the light tracking splitter 186 and the quadrant photodetector 188 may be assembled as a tracking module 30. According to another embodiment, the tracking module 30 further comprises another part other than the aforementioned parts, or omits one or some of the aforementioned parts.

The first light emitter 110 is used to emit a first distance measurement light L1 and a sampling light L2. The first distance measurement light L1 is invisible light, for example, laser light with the wavelength of 1550 nm. The first distance measurement light L1 may be transmitted via the first fiber 115. The first fiber 115 has a first optical coupler 1151. The first distance measurement light L1 emitted from the first optical coupler 1151 is incident to the polarized beam splitter 120. In another embodiment, the first light emitter 110 having a polarization controller is used to control the polarization direction of the first distance measurement light L1, so as to let the polarization angle of the first distance measurement light L1 be substantially the same as that of the first polarizer 125. As a result, the optical loss of the first distance measurement light L1 passing through the first polarizer 125 can be reduced.

The first distance measurement light L1 is converted to the light with a particular polarization angle by passing through the first polarizer 125. The polarized beam splitter 120 splits the first distance measurement light L1 into a first splitting light L11 and a second splitting light L12. In one embodiment, the first polarizer 125, for example a 45-degree polarizer, makes the first splitting light L11 and the second splitting light L12, which pass through the polarized beam splitter 120, have substantially the same intensity at 90 degree and 0 degree, respectively. The horizontal direction (for example, parallel to the surface of a desk) is used as a reference direction for the angle described in this disclosure. In another embodiment, the first polarizer 125 may be a polarizer with different polarization angles. Further, the first polarizer 125 may be omitted, according to an alternation of an optical path design and/or an optical demand.

In the embodiment, the polarization angle of the first splitting light L11 is 90 degrees while the polarization angle of the second splitting light L12 is 0 degree. After passing through the first optical path OP1, the first splitting light L11 is coupled with the second splitting light L12 to form a second distance measurement light L3. The signal controlling and processing module 178 may calculate the distance between the object 10 and the distance measuring device 100, according to the second distance measurement light L3 and the sampling light L2.

As shown in FIG. 1, the first optical path passes through, in order, the first wave plate 130, the dichroic beam splitter 135, the beam expander 137, the object 10, the beam expander 137, the dichroic beam splitter 135, the first wave plate 130, the polarized beam splitter 120, the second wave plate 140, the first convex lens 145, the reference point 150, the first convex lens 145, the second wave plate 140, the polarized beam splitter 120 and the second polarizer 155.

In detail, the first wave plate 130 is disposed between the polarized beam splitter 120 and the dichroic beam splitter 135. Since the first splitting light L11 is linear polarized light, it is converted to circular polarized light after passing through the first wave plate 130.

The characteristic of the dichroic beam splitter 135 in the embodiment is that the light with a certain wavelength can pass through while the light with a different wavelength will be reflected. For example, the first splitting light L11 may pass through the dichroic beam splitter 135 and is incident to the object 10, while a tracking light L4 is reflected by the dichroic beam splitter 135 and is incident to the object 10.

The beam expander 137 is disposed between the object 10 and the dichroic beam splitter 135. The beam expander 137 expands the diameter of the beam of the first splitting light L11 to reduce the energy loss and the divergent angle of the beam of the first splitting light L11 after a long-distance propagation.

The first splitting light L11 reflected from the object 10 (hereafter refer to as the first splitting light L11') passes through the beam expander 137, the dichroic beam splitter 135, the first wave plate 130, the polarized beam splitter 120, the second wave plate 140 and the first convex lens 145, and is incident to the reference point 150. The second wave plate 140 is disposed between the polarized beam splitter 120 and the reference point 150. The first convex lens 145 is disposed between the polarized beam splitter 120 and the reference point 150. The second polarizer 155 is disposed between the polarized beam splitter 120 and a second optical coupler 161 of the second fiber 160. In another embodiment, the second wave plate 140, the beam expander 137, the first convex lens 145 and/or the second polarizer 155 may be omitted according to an alternation of an optical path design and/or an optical demand.

After passing through the first wave plate 130, the first splitting light L11' is converted to a linear polarized light (for example, 0-degree polarized light) which is perpendicular to the first splitting light L11. The second wave plate 140 is, for example, a quarter wave plate, which causes the first splitting light L11' to be converted into a circular polarized light after the first splitting light L11' passes through the second wave plate 140. With the design of the second wave plate 140, the optical loss may be reduced. With the first convex lens 145, the intensity of the first splitting light L11' may focalize on the reference point 150, so as to reduce the optical loss of the reflected light from the reference point 150. The reference point 150, for example a reflection ball, may be formed by reflective materials. The reflective materials may be metal, for example, a stainless steel, but not limited thereto.

The first splitting light L11" reflected from the object 10 (hereafter refer to as the first splitting light L11") passes through the first convex lens 145 and the second wave plate 140, and is incident to the polarized beam splitter 120. Then, the first splitting light L11" is reflected by the polarized beam splitter 120, and after passing through the second polarizer 155, it is incident to the second fiber 160.

The second polarizer 155 is, for example, a 45-degree polarizer, which causes the first splitting light L11' to be converted into 45-degree polarized light after the first splitting light L11' passes through the second polarizer 155. Similarly, the second splitting light L12 passing through the second polarizer 155 is also converted into 45-degree polarized light.

The second splitting light L12 of the first distance measurement light L1 coupled with the first splitting light L11" transmitted through the first optical path OP1 forms the second distance measurement light L3. The second distance measurement light L3 is incident to the second optical coupler 161 of the second fiber 160, and is coupled with the sampling light L2 after transmitting by the second fiber 160.

The second fiber 160 further comprises a fourth optical coupler 162. The second distance measurement light L3 is emitted from the fourth optical coupler 162, and then is incident to the photodetector 176 via the third optical path OP3. In addition, the third fiber 165 comprises a third optical coupler 1651. The sampling light L2 is transmitted by the third fiber 165 and is emitted from the third optical coupler 1651, and is incident to the photodetector 176 via the third optical path OP3. The third optical path OP3 passes through, in order, the second convex lens 170, the crystal frequency multiplier 172 and the third convex lens 174.

Figure 1A:
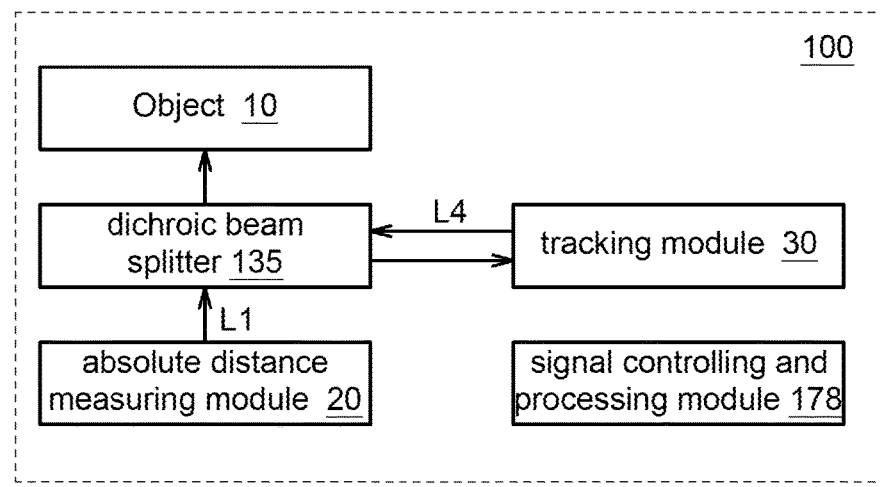
FIG. 1A illustrates a distance measuring device in accordance with another exemplary embodiment.
Figure 1B:
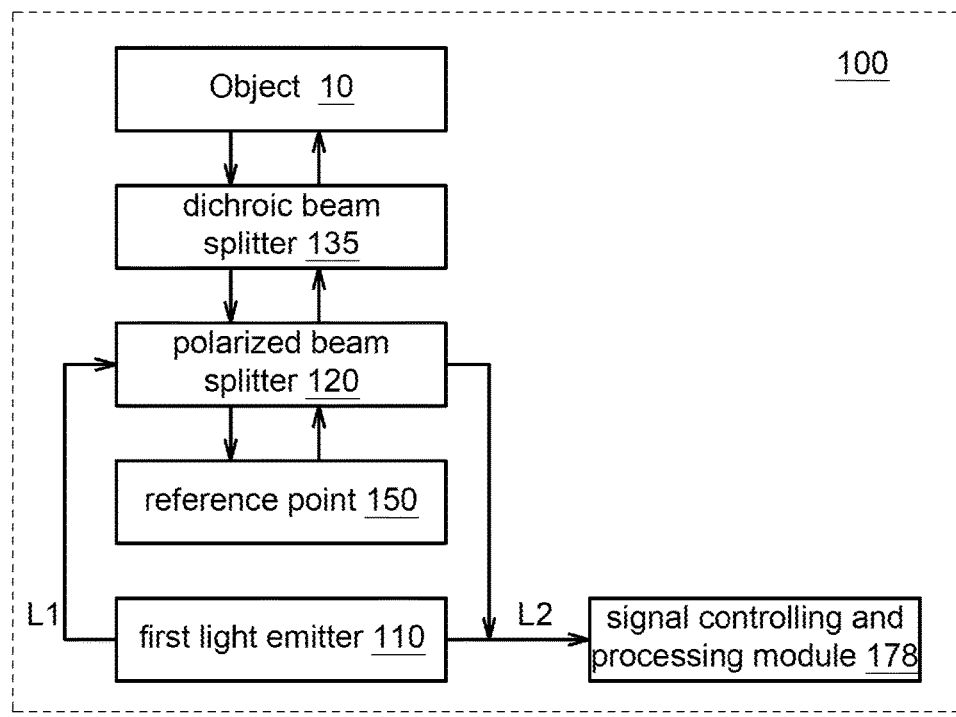
FIG. 1B illustrates a distance measuring device in accordance with another exemplary embodiment.
Figure 2:
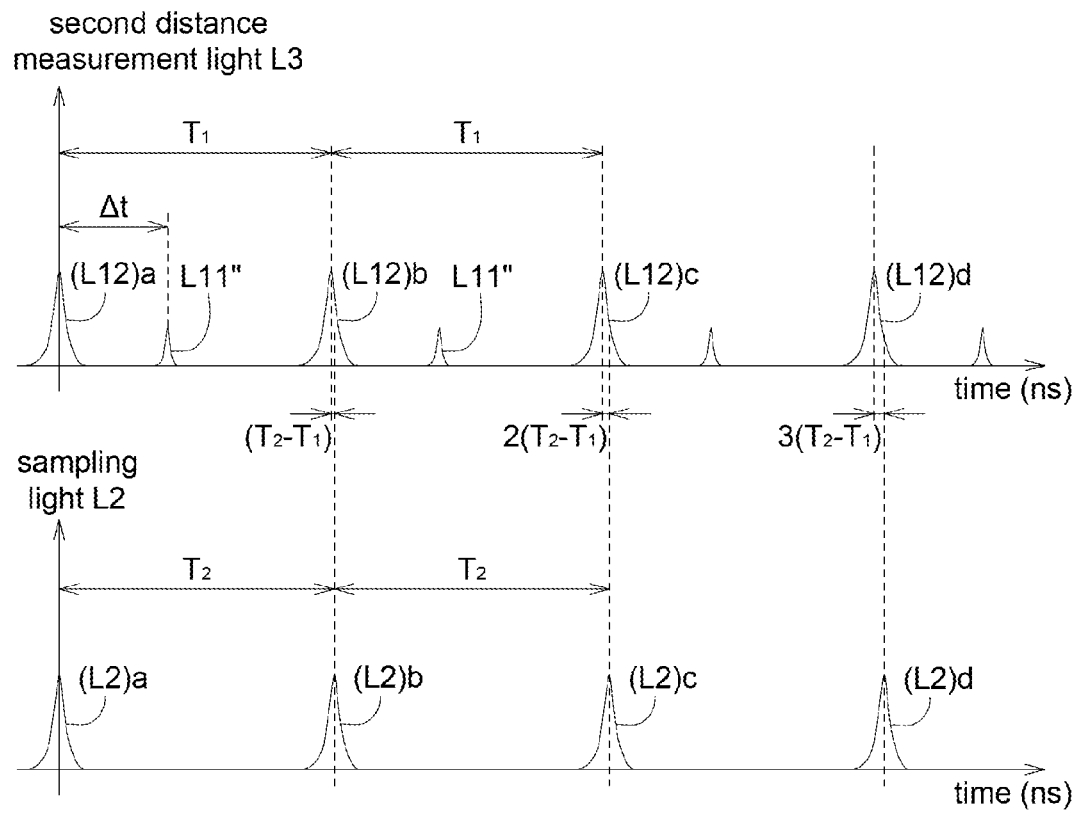
FIG. 2 illustrates signal waveforms of the second distance measurement light and the sampling light after passing through the crystal frequency multiplier, in accordance with an exemplary embodiment.

The second convex lens 170 focalizes the second distance measurement light L3 and the sampling light L2 on the crystal frequency multiplier 172 (for example, a periodically poled lithium niobate, PPLN). After passing through the crystal frequency multiplier 172, the second distance measurement light L3 and the sampling light L2 pass through the third convex lens 174. This concentrates the second distance measurement light L3 and the sampling light L2 on being incident to the photodetector 176. With the photodetector 176, the signal controlling and processing module 178 calculates the distance between the distance measuring device 100 and the object 10 according to the second distance measurement light L3 and the sampling light L2. The display 180 may display the value of the distance or waveforms of the aforementioned optical signals. FIG. 2 is used to describe the procedure of a distance calculation. FIG. 1A and FIG. 1B illustrates a distance measuring device in accordance with an exemplary embodiment.

FIG. 2 shows signal waveforms of the second distance measurement light L3 and the sampling light L2 after the lights, L3 and L2, passing through the crystal frequency multiplier 172. Since the length of the first optical path OP1 that the first splitting light L11" passes through is longer than the optical path that the second splitting light L1 passes through, there is a phase difference Δt between the period of the first splitting light L11" and the period T1 of the second splitting light L12. In addition, the repetition rate (the reciprocal of the period T1) of the second splitting light L12 is different from the repetition rate of the sampling light L2. Therefore, the period T2 of the sampling light L2 is also different from the period T1 of the second splitting light L12. Accordingly, for several signals of the second splitting light L12, the period difference between each of the several signals and its corresponding sampling light L2 is n times as many as $(T_2-T_1)$, wherein n may be 0 or any positive integer, or determined according to the number of samples. With the different designs for the repetition rates of the second splitting light L12 and the sampling light L2, the amplified period effect is generated after sampling the second splitting light L12.

Figure 3:
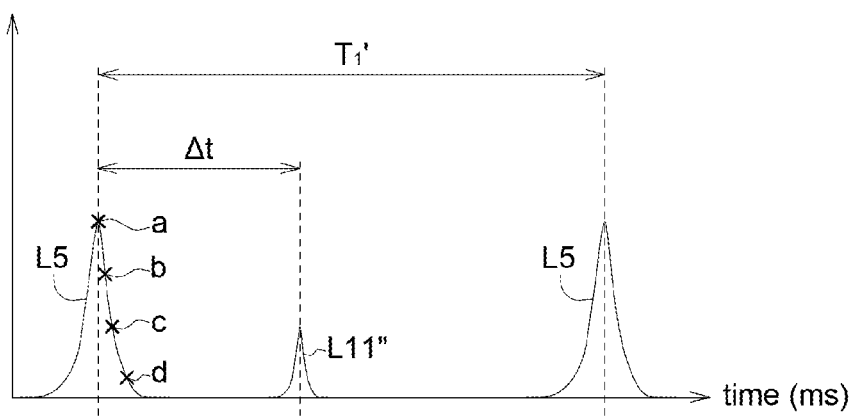
FIG. 3 illustrates the waveform of the coupled signal of the second distance measurement light and the sampling light shown in FIG. 2, in accordance with an exemplary embodiment.

FIG. 3 shows the waveforms of the coupled signal of the second distance measurement light L3 and the sampling light L2 shown in FIG. 2. After coupling the second splitting light L12 and the sampling light L2 (or sampling the second splitting light L12), the waveforms of the coupled signal L5 shown in FIG. 3 is obtained.

For a point a of the coupled signal L5, the point a is the signal point after coupling the second splitting light $(L12)_a$ and the sampling light $(L2)_a$ shown in FIG. 2. Since there is no period difference (n=0) between the second splitting light $(L12)_a$ and the sampling light $(L2)_a$, the intensity of the coupled signal is the strongest. For a point b, the point b is the signal point after coupling the second splitting light $(L12)_b$ and the sampling light $(L2)_b$ shown in FIG. 2. Since there is a period difference of $(T_2-T_1)$ between the second splitting light $(L12)_b$ and the sampling light $(L2)_b$, the intensity of the coupled signal at point b is weaker than that at point a. For a point c, the point c is the signal point after coupling the second splitting light $(L12)_c$ and the sampling light $(L2)_c$ shown in FIG. 2. Since there is a period difference of $2 \times (T_2-T_1)$ between the second splitting light $(L12)_b$ and the sampling light $(L2)_b$, the intensity of the coupled signal at point c is weaker than that at point b. The coupled signal waveform shown in FIG. 3 is obtained by repeating the aforementioned steps. As shown in FIG. 3, when the coupled signal is the weakest, the signal of the sampling light L2 stands out.

After obtaining the coupled signal L5, the signal controlling and processing module 178 calculates the distance d between the distance measuring device 100 and the object 10 by using the following equation (1). In the equation (1), c denotes the speed of light in vacuum. n denotes the index of refraction of air. fr denotes the repetition rate (Hz) of the first distance measurement light L1 (that is, the reciprocal of the period T1 of the first distance measurement light L1). $T_1'$ is the period of the coupled signal L5.

$$d = \left(\frac{c}{2n}\right)\left(\left(\frac{\Delta t}{T_1'}\right) f_r\right) \quad (1)$$

In addition, the relationship between the period $T_1'$ of the coupled signal L5 and the period difference $(T_2-T_1)$ is given by equation (2). From the equation (2), the period $T_1'$ is increased (comparing with the period T1 of the first distance measurement light L1) after sampling by the signal coupling method in the embodiments of this disclosure. Consequently, the photodetector 176 may detect almost all the coupled signals L5. The accuracy of calculating the distance is accordingly increased. Further, if the first distance measurement light L1 shown in FIG. 2 is used to calculate a distance, the photodetector 176 inevitably misses some signals of the first distance measurement light L1, because the period T1 of the first distance measurement light L1 is too short. In contrast, in the embodiments of this disclosure, because the period $T_1'$ has already been amplified (comparing with the period $T_1$, the period $T_1'$ is larger), the photodetector 176 may detect more or almost all the coupled signals L5, so as to increase accuracy of measuring the distance. In addition, even if the repetition rate of the first distance measurement light L1 emitted from first light emitter 110 is high (that is, the period is short), the photodetector 176 still increases the signal resolution while detecting the first distance measurement L1 (after coupling), so as to reduce the amount of missing the first distance measurement light L1.

$$T'_1 = \left(\frac{1}{2(T_2 - T_1)}\right) \quad (2)$$

According to an embodiment, if the period T1 of the first distance measurement L1 shown in FIG. 2 is on a nanosecond-scale (ns-scale), the period $T_1'$ of the coupled signal L5 shown in FIG. 3 may be scaled up to microsecond (ms). Therefore, the photodetector 176 may detect almost all coupled signals L5.

As shown in FIG. 1, the second light emitter 182 may emit the tracking light L4. The tracking light L4 may be visible light, for example, laser light having a wavelength of 633 nm. After passing through the second optical path OP2, the tracking light L4 is incident to the quadrant photodetector 188. The second optical path OP2 passes through, in order, the light tracking splitter 186, the dichroic beam splitter 135, the beam expander 137, the object 10, the beam expander 137, the dichroic beam splitter 135 and the light tracking splitter 186. According to another embodiment, the beam expander 137 may be omitted from the distance measuring device 100.

In addition, the dichroic beam splitter 135 may reflect the tracking light L4. The tracking light L4 reflected from the dichroic beam splitter 135 is incident to the object 10 after passing through the beam expander 137. The tracking light L4 reflected from the object 10 passes through the beam expander 137 and then is incident to the dichroic beam splitter 135. Finally, the tracking light L4 reflected from the dichroic beam splitter 135 is incident to the quadrant photodetector 188 after passing through the light tracking splitter 186. Accordingly, a displacement change of the object 10 is detected by the quadrant photodetector 188.

Figure 4:
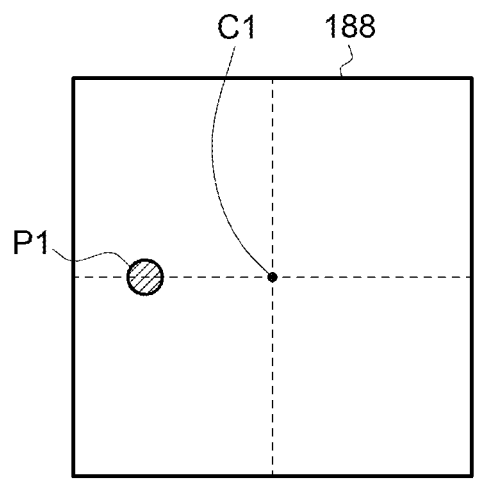
FIG. 4 illustrates a tracking point of the quadrant photodetector shown in FIG. 1 in accordance with another exemplary embodiment.

FIG. 4 shows a tracking point P1 of the quadrant photodetector 188 shown in FIG. 1. The tracking point P1 appears after the tracking light L4 is reflected to the quadrant photodetector 188. A relative position of the object 10 with respect to the distance measurement device 100 may be obtained by analyzing a position of the tracking point P1 relative to a center C1. To avoid the distance measuring of the optical path to be interrupted, the distance measuring device 100 may track the object 10 to allow the tracking point P1 to go back to the center C1 of the quadrant photodetector 188.

Figure 5:
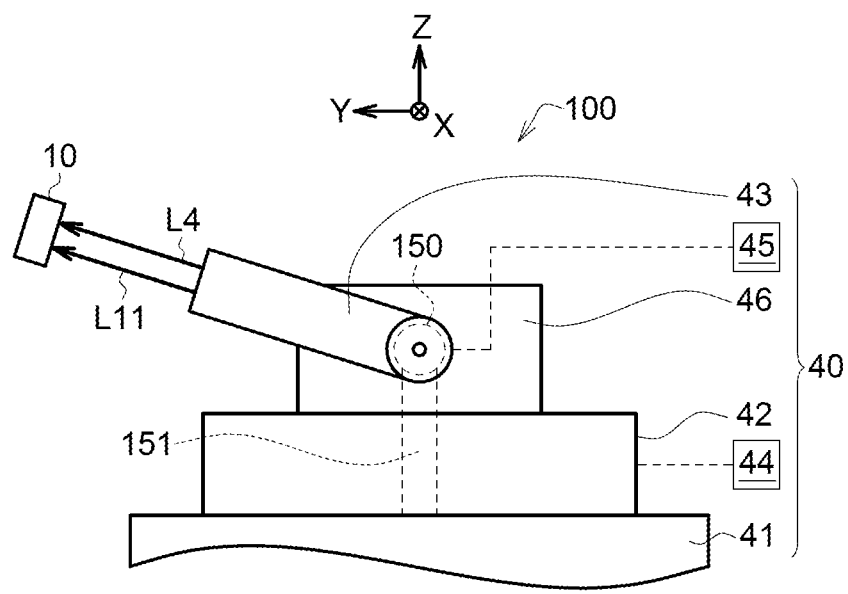
FIG. 5 illustrates a mechanical structure of the distance measuring device in accordance with an exemplary embodiment.

FIG. 5 shows a mechanical structure of the distance measuring device 100 accordingly to an embodiment of this disclosure. The distance measuring device 100 includes a two-axis rotation mechanism 40 controlled by the signal controlling and processing module 178, to drive the absolute distance measuring module 20, the tracking module 30 and the dichroic beam splitter 135. The two-axis rotation mechanism 40 may further comprise a base station 41, a rotation member 42, a detection head 43, a first driver 44, a second driver 45 and a bearing member 46.

Some parts shown in FIG. 1 may be assembled into a module, For example, the first optical coupler 1151, the polarized beam splitter 120, the first polarizer 125, the first wave plate 130, the dichroic beam splitter 135, the beam expander 137, the second wave plate 140, the first convex lens 145, the reference point 150, the second polarizer 155, the second optical coupler 161, the second light emitter 182, the light tracking splitter 186, and the quadrant photodetector 188 may be assembled in the detection head 43. These aforementioned parts shown in FIG. 1 may move as the detection head 43 moves, while there is no relative movement among these parts.

In addition, the rotation member 42 moving around the Z axis (the third axis) is disposed, in a rotatable manner, on the base station 41. Wherein the reference point 150 and the rotation member 42 are disposed in a manner that their positions relative to each other are adjustable. The bearing member 46 connected to the rotation member 42 rotates with the rotation member 42. The detection head 43 moving around the X axis (the first axis) is disposed, in a rotatable manner, on the bearing member 46. The first driver 44 may control the rotation member 42 to rotate while the second driver 45 controls the detection head 43 to rotate. Accordingly, the detection head 43 may be controlled to rotate around two-axis. The signal controlling and processing module 178 (as shown in FIG. 1) may control the first driver 44 and the second driver 45 to rotate the detection head 43 for automatically tracking the moving object 10, so as to avoid the distance measuring of the optical path to be interrupted. Consequently, the distance measuring device 100 may track the moving object 10 and measure an absolute distance between the object 10 and the distance measuring device 100. In an embodiment, the first driver 44 and the second driver 45 are, for example, a motor, a belt pulley system or a combination thereof.

In addition, as shown in FIG. 1 and FIG. 5, during the rotation of the detection head 43, the reference point 150 is relatively stationary. During measuring an absolute distance between the object 10 and the distance measuring device 100, even if there is a displacement shift along a radial direction occurring in both the first driver 44 and the second driver 45 (the radial direction is the direction from the reference point 150 towards the object 10), the total distance between the object 10 and the reference point 150 will not change regardless of a shift along the radial direction occurring in the detection head 43. In other words, the accuracy for measuring the absolute distance is pretty high. As shown in FIG. 5, the reference point 150 may be connected to the base station 41 by using a rod member 151, wherein the rod member 151 and the reference point 150 is connected fixedly.

The distance measuring device 100 may be calibrated before using, in order to increase the accuracy for the distance measuring. For example, a relative position on the X-Y plane of the reference point 150 (or the rod member 151) is adjusted by applying a force along X-axis direction and/or Y-axis direction (the second-axis direction) with respect to the rotation member 42, and this causes the amount of a rotation eccentric shaft between the rotation member 42 and the reference point 150 is less than a predetermined value, for example, 5 micrometers. This predetermined value may be much less or greater. In other words, positions of the reference point 150 and the rotation member 42 are adjustable on the X-Y plane, and the Z axis is perpendicular to the X-Y plane. Because there is a gap around the connection area between the rod member 151 and the rotation member 42, the rod member 151 and the reference point 150 will shift within the gap with respect to the rotation member 42 while a force is applied to the rod member 151.

In addition, the bearing member 46 and the rotation member 42 are disposed along the Y axis in a manner that a position of the bearing member 46 relative to the rotation member 42 is adjustable. And/or the bearing member 46 and the rotation member 42 are disposed in a manner that moving around a slanted angle of the Y axis is adjustable. Wherein the X axis is perpendicular to the Y axis. Because there is a gap around the connection area between the bearing member 46 and the rotation member 42, the bearing member 46 will shift or rotate slantingly within the gap with respect to the rotation member 42 while a force is applied to the bearing member 46 or the rotation member 42.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A distance measuring device for tracking an object and measuring a distance between the distance measuring device and the object, comprising:
   an absolute distance measuring module, used to emit a first distance measurement light for measuring an absolute distance between the distance measuring device and the object;
   a tracking module, used to emit a tracking light to track the absolute distance between the distance measuring device and the object;
   a dichroic beam splitter, wherein the first distance measurement light and the tracking light are incident to the object through the dichroic beam splitter;
   a processor; and
   a two-axis rotating mechanism, controlled by the processor, to drive the absolute distance measuring module, the tracking module and the dichroic beam splitter, so as to track the object.

2. The distance measuring device according to claim 1, wherein the absolute distance measuring module comprises:
   a first light emitter, used to emit the first distance measurement light and a sampling light;
   a reference point; and
   a dichroic beam splitter, used to split the first distance measurement light into a first splitting light and a second splitting light;
   wherein after passing through a first optical path, the first splitting light is coupled with the second splitting light to form a second distance measurement light, wherein the first optical path passes through, in order, the dichroic beam splitter, the object, the dichroic beam splitter, the polarized beam splitter, the reference point and the polarized beam splitter, and wherein the processor calculates the distance according to the second distance measurement light and the sampling light.

3. The distance measuring device according to claim 1, wherein the tracking module comprises:
   a light emitter, used to emit a tracking light;
   a light tracking splitter; and
   a quadrant photodetector;
   wherein the tracking light is incident to the quadrant photodetector after passing through a second optical path, and wherein the second optical path passes through, in order, the light tracking splitter, the dichroic beam splitter, the object, the dichroic beam splitter and the light tracking splitter.

4. The distance measuring device according to claim 1, wherein a wavelength of the tracking light is different from the wavelength of the first distance measurement light.

5. The distance measuring device according to claim 1, wherein the two-axis rotation mechanism comprises a rotation member, a base station, and a detection head, wherein the base station is connected to the rotation member, so as to rotate with the rotation member, and wherein the detection head is disposed, in a rotatable manner, on the base station.

6. The distance measuring device according to claim 5, wherein the detection head moving around a first axis is disposed, in a rotatable manner, on a bearing member, wherein the bearing member and the rotation member are disposed along a second axis in a manner that a position of the bearing member relative to the rotation member is adjustable, and the bearing member and the rotation member are disposed in a manner that moving around a slanted angle of the second axis is adjustable, and wherein the first axis is perpendicular to the second axis.

7. The distance measuring device according to claim 1, wherein the two-axis rotating mechanism comprises a base station and a rotation member, wherein the rotation member is disposed, in a rotatable manner, on the base station, and wherein the reference point and the rotation member are disposed in a manner that their positions relative to each other are adjustable.

8. The distance measuring device according to claim 7, wherein the rotation member moving around a axis is disposed, in a rotatable manner, on a bearing member, wherein positions of both the reference point and the rotation member are adjustable on a plane, and wherein the axis is perpendicular to the plane.

9. A distance measuring device for measuring a distance between the distance measuring device and an object, comprising:
   a first light emitter, used to emit a first distance measurement light and a sampling light;
   a reference point;
   a dichroic beam splitter;
   a polarized beam splitter, used to split the first distance measurement light into a first splitting light and a second splitting light; and
   a processor;
   wherein after passing through a first optical path, the first splitting light is coupled with the second splitting light to form a second distance measurement light, wherein the first optical path passes through, in order, the dichroic beam splitter, the object, the dichroic beam splitter, the polarized beam splitter, the reference point and the polarized beam splitter, and wherein the processor calculates the distance according to the second distance measurement light and the sampling light.

10. The distance measuring device according to claim 9, wherein a wavelength of a tracking light is different from the wavelength of the first distance measurement light.

11. The distance measuring device according to claim 9, further comprising: a first polarizer disposed between the first light emitter and the dichroic beam splitter.

12. The distance measuring device according to claim 9, further comprising: a first wave plate disposed between the polarized beam splitter and the dichroic beam splitter.

13. The distance measuring device according to claim 9, further comprising: a wave plate disposed between the polarized beam splitter and the reference point.

14. The distance measuring device according to claim 9, further comprising:
   a first fiber having a first optical coupler;

wherein after passing through the first fiber and being emitted from the first optical coupler, the first distance measurement light is incident to the polarized beam splitter.

15. The distance measurement device according to claim 9, further comprising:
    a fiber, having a second optical coupler; and
    a polarizer, disposed between the polarized beam splitter and the optical coupler.

16. The distance measuring device according to claim 9, further comprising: a first convex lens disposed between the polarized beam splitter and the reference point.

17. The distance measuring device according to claim 9, further comprising:
    a second light emitter used to emit a tracking light;
    a light tracking splitter; and
    a quadrant photodetector;
    wherein after passing through a second optical path, the tracking light is incident to the quadrant photodetector, wherein the second optical path passes through, in order, the light tracking splitter, the dichroic beam splitter, the object, the dichroic beam splitter and the light tracking splitter.

18. The distance measuring device according to claim 17, wherein the tracking light is laser light having a wavelength of 633 nm.

19. The distance measuring device according to claim 9, wherein the first distance measurement light is laser light having a wavelength of 1550 nm.

20. The distance measuring device according to claim 9, further comprising:
    a convex lens;
    a crystal frequency multiplier; and
    a photodetector;
    wherein after passing through a third optical path, the sampling light and the second distance measurement light are incident to the photodetector, and wherein the third optical path passes through, in order, the convex lens and the frequency doubling crystal.

21. The distance measuring device according to claim 20, further comprising:
    a fiber having an optical coupler; wherein after passing through the fiber and being emitted from the optical coupler, the sampling light is incident to the convex lens.

22. The distance measuring device according to claim 9, further comprising: a beam expander disposed between the object and the dichroic beam splitter.

23. The distance measuring device according to claim 22, wherein a repetition rate of the first distance measurement light is different from a repetition rate of the sampling light.

24. A distance measuring method for measuring a distance between a distance measuring device and an object, comprising:
    providing the distance measuring device having a first light emitter, a reference point, a dichroic beam splitter, a polarized beam splitter and a processor;
    emitting a first distance measurement light and a sampling light by the first light emitter, wherein the first distance measurement light is split into a first splitting light and a second splitting light by the polarized beam splitter;
    coupling the first splitting light passing through a first optical path with the second splitting light to form a second distance measurement light, wherein the first optical path passes through, in order, the dichroic beam splitter, the object, the dichroic beam splitter, the polarized beam splitter, the reference point and the polarized beam splitter; and
    calculating, by the processor, the distance according to the second distance measurement light and the sampling light.

* * * * *